United States Patent [19]
Patridge

[11] Patent Number: 5,570,765
[45] Date of Patent: Nov. 5, 1996

[54] CLUTCH/BRAKE ASSEMBLY

[75] Inventor: Arthur G. Patridge, Advance, N.C.

[73] Assignee: North American Clutch Corp., Milwaukee, Wis.

[21] Appl. No.: 460,463

[22] Filed: Jun. 2, 1995

[51] Int. Cl.$^6$ .................................................. F16D 67/02
[52] U.S. Cl. ...................... 192/15; 192/18 R; 192/93 A; 56/11.3
[58] Field of Search .................................. 192/18 R, 15, 192/16, 93 A; 56/11.3

[56] References Cited

U.S. PATENT DOCUMENTS

| | | | |
|---|---|---|---|
| 2,378,117 | 6/1945 | Whiting | 192/18 R |
| 2,891,642 | 6/1959 | Moore | 192/18 R |
| 4,141,439 | 2/1979 | Lunde et al. | 192/18 R |
| 4,205,509 | 6/1980 | Miyazawa et al. | 56/11.3 |
| 4,213,521 | 7/1980 | Modersohn | 192/18 |
| 4,226,313 | 10/1980 | Meldahl et al. | 192/18 |
| 4,286,701 | 9/1981 | MacDonald | 192/18 R |
| 4,306,405 | 12/1981 | Fleigle | 192/18 R X |
| 4,313,293 | 2/1982 | Nagai | 56/11.3 |
| 4,333,303 | 6/1982 | Plamper | 56/11.3 |
| 4,352,266 | 10/1982 | Lloyd et al. | 56/11.3 |
| 4,372,433 | 2/1983 | Mitchell et al. | 192/18 R |
| 4,377,224 | 3/1983 | Takata et al. | 192/18 R |
| 4,433,764 | 2/1984 | Goscenski, Jr. | 192/18 R |
| 4,524,853 | 6/1985 | Nagai | 192/18 R |
| 4,538,712 | 9/1985 | Naga | 192/18 R |
| 5,033,595 | 7/1991 | Pardee | 192/18 R |
| 5,293,731 | 3/1994 | Thomas et al. | 56/11.3 |

Primary Examiner—Rodney H. Bonck
Attorney, Agent, or Firm—Michael, Best & Friedrich

[57] ABSTRACT

A clutch/brake assembly for a machine having a rotating output shaft and a fixed mounting plate which includes an input disc coupled to the output shaft for rotation therewith and moveable axially relative thereto, an output disc moveable axially relative to the output shaft and rotatable relative thereto and a brake member fixed to the mounting plate and adjacent the output shaft. A high friction pad is mounted on the output disc for coupling the output disc to the input disc and for arresting the rotation of the output disc upon engagement with the brake member. Springs urge the input disc axially away from the output disc the output disc axially into engagement with the brake member. A cam assembly is coupled to the input disc and is movable from a first position to a second position for moving the input disc axially against the springs and into engagement with the high friction pad and for moving the high friction pad out of engagement with the brake member whereby the output disc is driven upon rotation of the output shaft,. The cam assembly is also operable upon movement from its second to its first position to permit the springs to move the input disc out of engagement with the high friction pad and the high friction pad into engagement with the brake member.

21 Claims, 2 Drawing Sheets

5,570,765

CLUTCH/BRAKE ASSEMBLY

BACKGROUND OF THE INVENTION

This invention relates to clutch/brake assemblies.

Clutch/brake assemblies for small engines, such as those used with lawn mowers and the like, generally include an input, an output and a brake and are operative to couple the input to the output for driving a cutter blade, for example, and to disengage the input from the output and engage the output with the brake whereby rotation of the cutter blade is arrested. Most prior art brake/clutch assemblies for small engines include biasing springs which urge the input member into pressure engagement with the output member and a cam assembly for disengaging the input and output members and for affecting the engagement of the output member with a brake element. These prior art brake/clutch assemblies were not wholly satisfactory because if the caming action fails, the clutch defaults to the drive mode.

SUMMARY OF THE INVENTION

It is an object of the invention to provide a new and improved brake/clutch assembly for small engines.

A further object of the invention is to provide a brake/clutch assembly for small engines which is compact and economical.

A further object of the invention is to provide a brake/clutch assembly for small engines which tends to default to the braking mode.

These and other objects and advantages of the present invention will become more apparent from the detailed description thereof taken with the accompanying drawings.

In general terms, the invention comprises a clutch/brake assembly, including a first member coupled to the output shaft for rotation therewith and moveable axially relative thereto, a second member movably axially relative to the output shaft and rotatable relative thereto and a third member fixed against rotation and mounted adjacent an engine output shaft. The second member has a high friction means for coupling the second member to the first and for arresting the rotation of the second member upon engagement with the fixed third member. Biasing means urges the first member axially away from the second member and the second member axially into engagement with the third member. A cam means is coupled to the first member and is moveable between a first position and a second position for moving the first member axially against the biasing means and out of engagement with the third member and into engagement with the high friction means on the second member whereby the second member is driven upon rotation of the output shaft. The cam means is also operable upon movement from its second position to its first position for permitting the biasing means to move the first member out of engagement with the high friction means and to move the second member and the high friction means into engagement with the third member.

DETAILED DESCRIPTION OF THE PREFERRED EMBODIMENT

Figure 1:
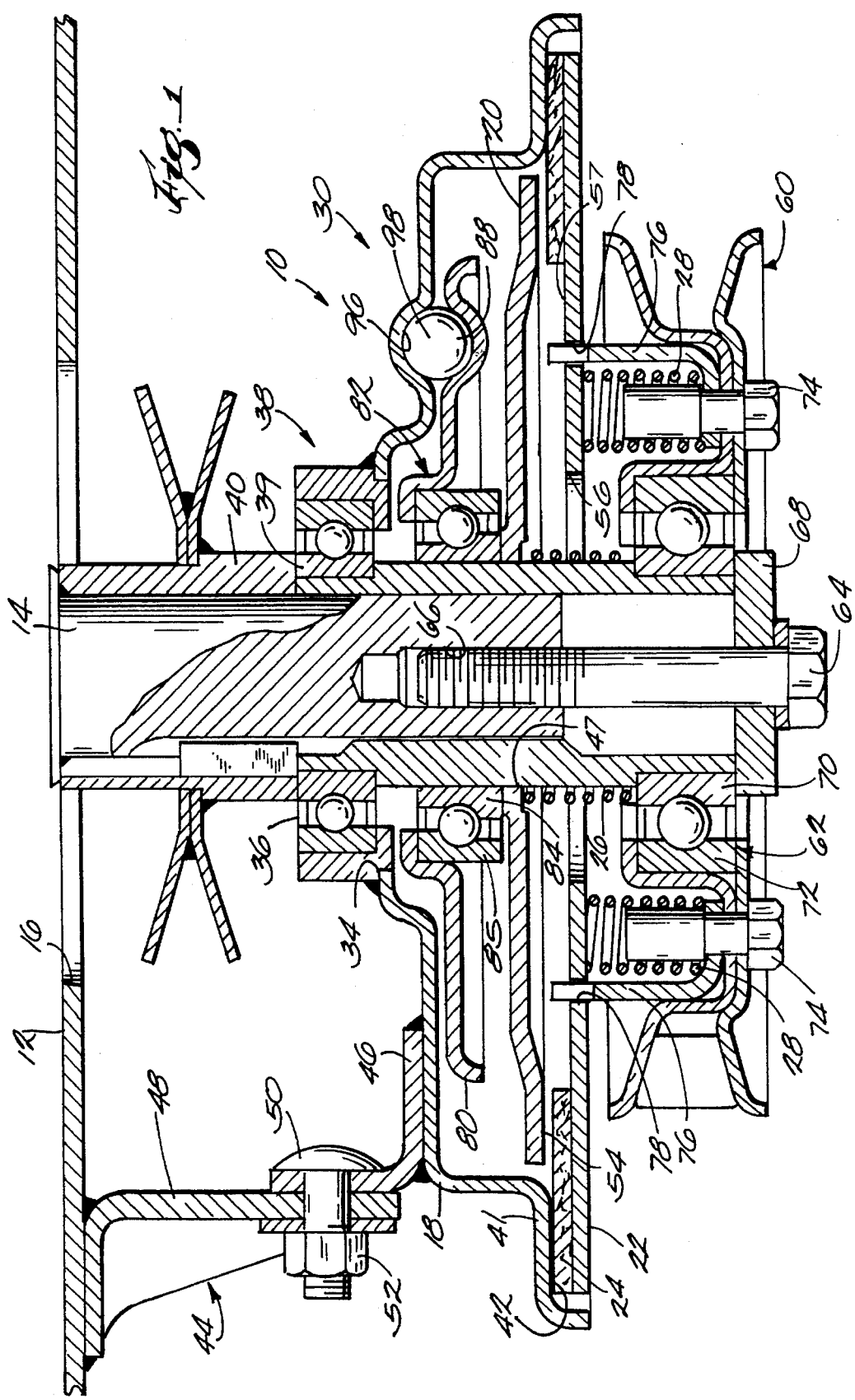
FIG. 1 is a side elevational view partly in section of the brake/clutch according to one embodiment of the invention.
Figure 2:
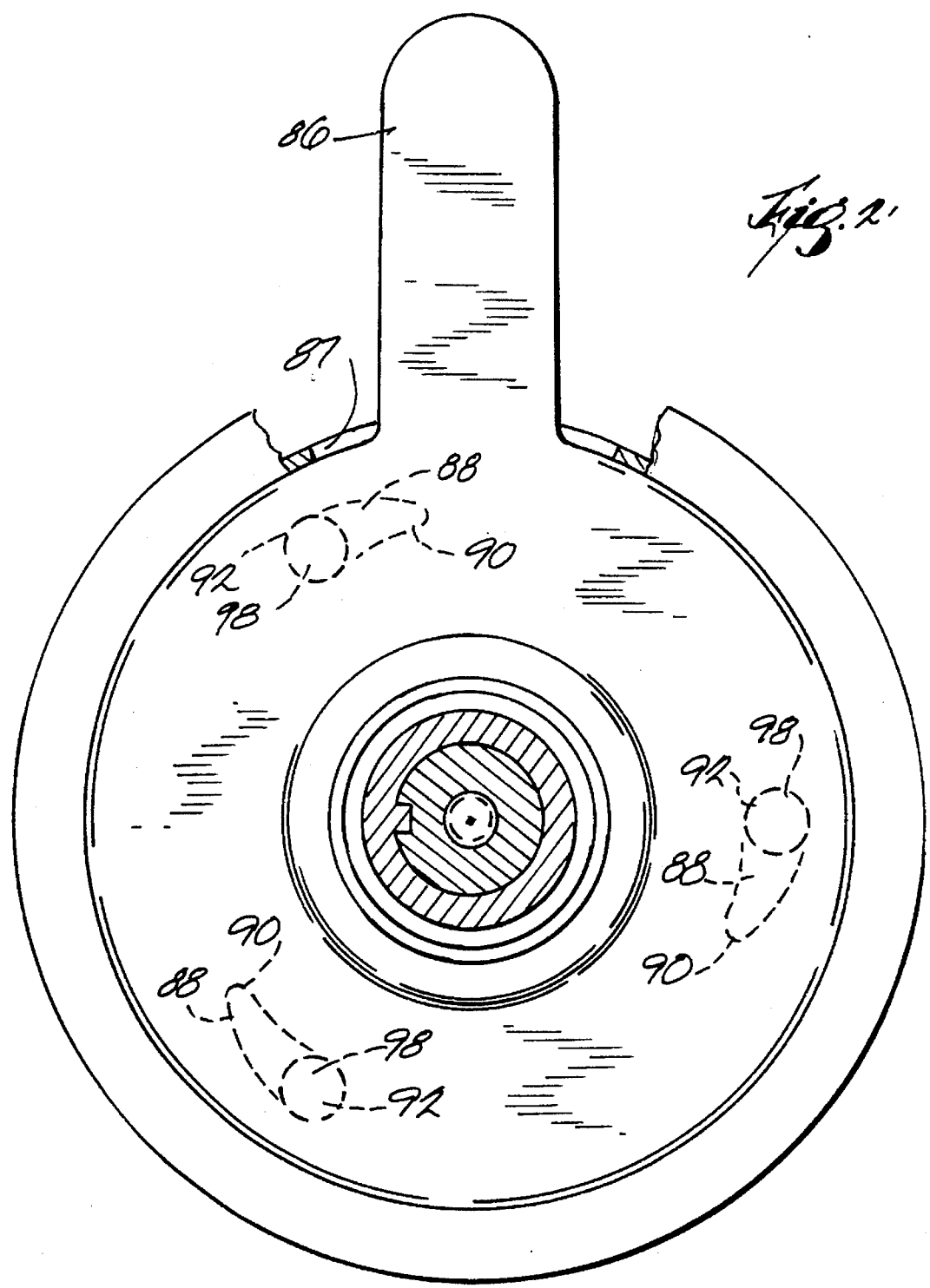
FIG. 2 is a view taken along lines 2—2 of FIG. 1.

The brake/clutch assembly 10 in accordance with the invention, as illustrated in FIGS. 1 and 2, may be used in many applications. For purposes of illustration, the invention will be discussed in connection with a lawn mower. As those skilled in the art will appreciate, lawn mowers generally include an internal combustion engine (not shown) which may be suitably mounted, such as on an engine deck 12. The engine includes an output shaft 14 extending downwardly through an opening 16 in deck 12. The brake/clutch assembly 10 generally includes a brake member 18 fixed to the engine deck 12, an input disc 20 driven by the shaft 14 and axially moveable relative thereto, an output disc 22 moveable axially relative to the shaft 14 and rotatable relative thereto, and a high friction pad 24 mounted on the upper surface of the output disc 22 and moveable therewith. A first biasing spring 26 urges the input disc 20 axially upward as viewed in FIG. 1, and away from the output disc 22 and the friction pad 24, and a second set of biasing springs 28 urge the output disc 22 and the friction pad 24 upwardly for engagement of the friction pad 24 with the brake member 18. A cam assembly 30 is coupled to the input disc 20 and is moveable between a first position shown in FIG. 1 and a second position wherein the input disc 20 is moved downwardly against biasing spring 26 and into engagement with the friction pad 24. This in turn moves the output disc 22 downwardly so that the friction pad 24 is disengaged from the brake member 18. In this mode, the output disc 22 is driven by the input disc 20. Return movement of the cam assembly 30 to its first position shown in FIG. 1 permits the spring 26 to move the input disc 20 out of engagement with the friction pad 24 and the springs 28 to move the output disc 22 and the friction pad 24 into engagement with the brake member 18 so that the output disc 22 is braked and the input disc 20 is a free wheeling mode.

The brake member 18 is circular in plan view to define an inner rim 34 which is fixed to the outer race 36 of the first bearing 38, whose inner race 39 is fixed to an input hub 40 on fixed to shaft 14. This permits relative rotation between the shaft 14 and the brake member 18. As seen in FIG. 1, the brake member 18 is stepped outwardly and downwardly to define an outer rim 41 having a downwardly facing annular brake surface 42. A brake torque reaction bracket 44 consisting of a first member 46 fixed to the brake member 18, a second member 48 fixed to the engine deck 12 and a bolt 50 and nut 52 which releasably secure the member 48 to the member 46. This anchors the brake member 18 to the engine deck 12.

The input disc 20 is generally circular and has a central opening 47 coupled by splines to the input hub 40 so that the output disc 20 is driven for rotation with the shaft 14 but is axially moveable relative thereto. In addition, the output disc 20 is slightly dished to define a downwardly facing contact surface 54 adjacent its outer periphery and concentric with and spaced inwardly from the brake surface 42.

The output disc 22 is a generally flat circular member having an central opening 56 spaced from the input hub 40. The friction pad 24 is generally annular and is fixed concentrically relative to the upper surface 57 of the output disc 22. The friction pad 24 is dimensioned so that an outer portion is generally coextensive with the brake surface 42 and an inner portion is generally coextensive with the contact surface 54 on the input disc 20.

An output pulley 60 is mounted at the lower end of shaft 14 by means of a bearing 62 which is held in position by a bolt 64 threaded into an axial bore 66 in the lower end of shaft 14 and a washer 68. The inner race 70 of bearing 62 is fixed to input hub 40 and the outer race 72 is fixed to the pulley 60. The first biasing spring 26 is a coil spring surrounding the input hub 40 and engages the inner race 70 of bearing 62 at a lower end and the under surface of the input disc 20 at its upper end for urging input disc 20 upwardly and out of engagement with the friction pad 24.

The biasing springs 28 comprise a plurality of individual coil springs arranged in an equi-angular relation around shaft 14 and between the lower surface of the output disc 22 and the pulley 60 for urging the output disc 22 upwardly for engaging the friction pad 24 with the brake surface 42. Springs 28 are maintained in position by pins 74 extending upwardly from pulley 60 and axially into the springs 28 from their lower ends. A plurality of drive pins 76 extend upwardly from the pulley 60 and through aligned holes 78 in the output disc 22. As a result, the output disc 22 is coupled to the pulley 60 rotation therewith but is axially moveable relative thereto.

The cam assembly 30 includes a bearing cup 80 mounted for axial movement on the shaft 14 by means of a bearing assembly 82 which includes an inner race 84 coupled by splines to the shaft 14 for axial movement thereon and a outer race 85 fixed to the inner rim of bearing cup 80. An operating handle 86 extends radially from the bearing cup 80 and through a slot 87 formed in the brake member 18. A plurality of arcuate grooves 88 are formed in the bearing cup 80 and each groove tapers outwardly and downwardly from a narrow end 90 to a wide end 92. In addition, a plurality of complimentary grooves 96 are formed in the brake member 80 in an opposed relation to the grooves 88. Disposed between the bearing cup 80 and the brake member 18 and in each of the spaces defined by the opposed grooves 88 and 96 is a cam ball 98.

When the clutch assembly 34 is in the position shown in FIG. 1, wherein the balls 98 are in the wide parts of the grooves 88 and 96, the biasing spring 26 holds the input disc 20 out of engagement with the friction pad 24 and the springs 28 hold the friction pad 24 on the output disc 22 in engagement with the brake member 18. When the bearing cup 80 is rotated by pivoting the operating handle 86 so that the grooves 88 and 96 are no longer aligned and the narrow portion 90 of groove 88 is adjacent the wide portion of the groove 96, the bearing cup 80 and the bearing assembly 82 are moved downwardly forcing the input disc 20 into engagement with the friction pad 24 and the output disc 22 downwardly to move the friction pad out of engagement with the brake surface 42. As a result, the input disc 20 is coupled to the output disc 22 so that the pulley 60 is coupled for rotation with the shaft 14.

If it is desired to disengage the input disc 20 from the output disc 22 and to brake the pulley 60, the bearing cup 80 is rotated, moving the grooves 88 and 96 into alignment so that the spring 26 can move the input disc 20 upwardly out of engagement with the friction pad 24 and the springs 28 can move the friction pad 24 on the output disc 22 into engagement with the brake member 18. As a result, the input disc free wheels and the pulley 60 is braked.

While only a single embodiment of the invention has been illustrated and described, it is not intended to be limited thereby, but only by the scope of the appended claims.

I claim:

1. A brake/clutch assembly for a machine having a rotating output shaft and a mounting means which is fixed relative to the output shaft, the brake/clutch assembly including a first member adapted to be coupled to an output shaft of the machine for rotation therewith and moveable axially relative thereto, a second member moveable axially relative to the output shaft and rotatable relative thereto, a third member adapted to be fixed to a fixed mounting means of a machine and adjacent the output shaft thereof, said second member having high friction means for coupling said second member to said first member and for arresting the rotation of the second member upon engagement with the third member, biasing means for urging said first member axially away from said second member and for urging said second member axially into engagement with said third member, and cam means coupled to the first member and movable between a first position and a second position for moving said first member axially against said biasing means and into engagement with said high friction means and for moving said high friction means out of engagement with the third member whereby said second member is driven upon rotation of the output shaft, said cam means being operable upon movement from its second to its first position for permitting said biasing means to move the first member out of engagement with the high friction means and the high friction means into engagement with the third member.

2. The brake/clutch assembly set forth in claim 1 wherein said first member comprises a first disc, said second member comprising a second disc, said high friction means being mounted on said second disc.

3. The brake/clutch assembly set forth in claim 2 wherein said first disc is disposed between said second disc and said third member, said high friction means being annular and fixed to said second disc and on the side thereof facing said first disc and said third member.

4. The brake/clutch set forth in claim 3 wherein said third member has an annular braking surface formed thereon and concentric with said first disc, said high friction means including a first portion positioned to be engaged by said braking surface and a second portion position to be engaged by said first disc.

5. The brake/clutch set forth in claim 4 wherein said biasing means includes a first spring engaging said first disc for urging said first disc axially away from said second disc and a plurality of second springs for urging said second disc and the high friction means disposed thereon toward engagement with said braking surface.

6. The brake/clutch assembly set forth in claim 5 and including output means mounted for rotation on said output shaft and fixed against axial movement thereon, means for coupling said output means to said second disc whereby said output means rotates upon rotation of said second disc, said coupling means permitting axial movement of said second disc relative to said output means.

7. The brake/clutch set forth in claim 6 wherein said second plurality of springs are disposed between said output means and said second disc.

8. The brake/clutch set forth in claim 7 wherein said cam means includes a first cam element pivotally mounted relative to said output shaft and engaging said first disc, a second cam element fixed relative to said output shaft and a plurality of third cam elements disposed between said first and second cam elements, pivotal movement of said first cam element from a first position to a second position being operative to force said first cam element axially toward said second disc for moving said first disc into engagement with the high friction means.

9. The brake/clutch set forth in claim 1 wherein said third member has an annular braking surface formed thereon and concentric with said first member, said high friction means including a first portion positioned to be engaged by said braking surface and a second portion position to be engaged by said first member said cam means includes a first cam element pivotally mounted relative to said output shaft and engaging said first disc, a second cam element fixed relative to said output shaft and a plurality of third cam elements disposed between said first and second cam elements, pivotal movement of said first cam element from a first position to a second position being operative to force said first cam element axially toward said second disc for moving said first disc into engagement with the high friction means.

10. The brake/clutch set forth in claim 1 wherein said biasing means includes a first spring engaging said first member for urging said first member axially away from said second member and a plurality of second springs for urging said second member and the high friction means disposed thereon toward engagement with said braking surface.

11. The brake/clutch assembly set forth in claim 1 and including output means mounted for rotation on said output shaft and fixed against axial movement thereon, means for coupling said output means to said second member whereby said output means will rotate upon rotation of said second member, said coupling means permitting axial movement of said second member.

12. The brake/clutch set forth in claim 11 wherein said second plurality of springs are disposed between said output means and said second disc.

13. The brake/clutch set forth in claim 12 wherein said cam means includes a first cam element pivotally mounted relative to said output shaft and engaging said first member, a second cam element fixed relative to said output shaft and a plurality of third cam elements disposed between said first and second cam elements, pivotal movement of said first cam element from a first position to a second position being operative to force said first cam element axially toward said second member for moving said first member into engagement with the high friction means.

14. The clutch/brake assembly set forth in claim 1 wherein said first member comprises a first disc, said second member comprising a second disc, said high friction means being mounted on said second disc, said first disc being disposed between said second disc and said third member, said high friction means being annular and fixed to said second disc and on the side thereof facing said first disc and said third member, said cam means includes a first cam element pivotally mounted relative to said output shaft and engaging said first disc, a second cam element fixed relative to said output shaft and a plurality of third cam elements disposed between said first and second cam elements, pivotal movement of said first cam element from a first position to a second position being operative to force said first cam element axially toward said second disc for moving said first disc into engagement with the high friction means.

15. A brake/clutch assembly for a machine having a rotating output shaft and a mounting means which is fixed relative to the output shaft, the brake/clutch assembly including a first member adapted to be coupled to the output shaft of the machine for rotation therewith and moveable axially relative thereto, a second member moveable axially relative to the output shaft and rotatable relative thereto, a third member adapted to be fixed to a fixed mounting means of the machine and adjacent the output shaft thereof, said second member having high friction means for coupling said second member to said first member and for arresting the rotation of the second member upon engagement with the third member, biasing means for urging said first member axially away from said second member and for urging said second member axially into engagement with said third member, and movable means coupled to the first member for moving said first member against the action of said biasing means to move said high friction means out of engagement with the third member whereby said second member is driven upon rotation of the output shaft, said moveable means also being operable to release of said first member to permit said biasing means to move the first member out of engagement with the high friction means and the high friction means into engagement with the third member whereby said second member is not driven.

16. The brake/clutch assembly set forth in claim 15 wherein said first member comprises a first disc, said second member comprising a second disc, said high friction means being mounted on said second disc.

17. The brake/clutch assembly set forth in claim 16 wherein said first disc is disposed between said second disc and said third member, said high friction means being annular and fixed to said second disc and on the side thereof facing said first disc and said third member.

18. The brake/clutch set forth in claim 17 wherein said third member has an annular braking surface formed thereon and concentric with said first disc, said high friction means including a first portion positioned to be engaged by said braking surface and a second portion position to be engaged by said first disc.

19. The brake/clutch set forth in claim 18 wherein said biasing means includes a first spring engaging said first disc for urging said first disc axially away from said second disc and a plurality of second springs for urging said second disc and the high friction means disposed thereon toward engagement with said braking surface.

20. The brake/clutch assembly set forth in claim 19 and including output means mounted for rotation on said output shaft and fixed against axial movement thereon, means for coupling said output means to said second disc whereby said output means rotates upon rotation of said second disc, said coupling means permitting axial movement of said second disc relative to said output means.

21. The brake/clutch set forth in claim 20 wherein said second plurality of springs are disposed between said output means and said second disc.

* * * * *